(12) United States Patent
Yamamoto et al.

(10) Patent No.: US 6,692,065 B2
(45) Date of Patent: Feb. 17, 2004

(54) FRAMING STRUCTURE AROUND VEHICLE DOOR OPENING

(75) Inventors: Kazuo Yamamoto, Gifu-ken (JP); Naoki Hori, Gifu-ken (JP); Akihiro Ito, Gifu-ken (JP)

(73) Assignee: Marujun Co., Ltd., Gifu-ken (JP)

(*) Notice: Subject to any disclaimer, the term of this patent is extended or adjusted under 35 U.S.C. 154(b) by 0 days.

(21) Appl. No.: 10/159,810

(22) Filed: May 31, 2002

(65) Prior Publication Data

US 2002/0190544 A1 Dec. 19, 2002

(30) Foreign Application Priority Data

Jun. 4, 2001 (JP) .................................. 2001-167912
Feb. 21, 2002 (JP) .................................. 2002-044742

(51) Int. Cl.[7] .......................................... B60R 27/00
(52) U.S. Cl. ................ 296/205; 296/203.03; 296/146.9
(58) Field of Search ....................... 296/205, 203.03, 296/209, 29, 146.9

(56) References Cited

U.S. PATENT DOCUMENTS

| | | | | |
|---|---|---|---|---|
| 4,552,400 A | * | 11/1985 | Harasaki et al. | 296/203.03 |
| 4,826,238 A | * | 5/1989 | Misono et al. | 296/205 |
| 5,048,887 A | * | 9/1991 | Kunishima et al. | 296/203.03 |
| 5,131,710 A | * | 7/1992 | Kamiguchi et al. | 296/29 |
| 5,246,264 A | * | 9/1993 | Yoshii | 296/203.03 |
| 5,269,585 A | * | 12/1993 | Klages et al. | 296/205 |
| 5,839,777 A | * | 11/1998 | Vlahovic | 296/205 |
| 5,941,597 A | * | 8/1999 | Horiuchi et al. | 296/203.03 |
| 6,217,109 B1 | * | 4/2001 | Okana et al. | 296/203.03 |
| 6,315,353 B1 | * | 11/2001 | Brodt et al. | 296/203.03 |

FOREIGN PATENT DOCUMENTS

| | | | |
|---|---|---|---|
| JP | 2000-095146 | 4/2000 | B62D/25/04 |
| JP | 2000-219150 | 8/2000 | B62D/25/02 |
| JP | 2000-219152 | 8/2000 | B62D/25/04 |
| JP | 2000-219153 | 8/2000 | B62D/25/04 |
| JP | 2000-219154 | 8/2000 | B62D/25/04 |
| JP | 2000-219155 | 8/2000 | B62D/25/04 |
| JP | 2001-010533 | 1/2001 | B62D/25/04 |

OTHER PUBLICATIONS

Kalpakjian, Serope, Manufacturing Processes for Engineering Materials, 1991, Addison–Wesley Publishing Companty, second edition, p 136.*

* cited by examiner

*Primary Examiner*—Joseph D. Pape
*Assistant Examiner*—Lori L Coletta
(74) *Attorney, Agent, or Firm*—Darby & Darby (57) ABSTRACT

A framing structure around a vehicle door opening has a hydraulically tube-formed tubular framework disposed inside the vehicle door opening to form a basic framing. The outer panel and the tubular framework are joined directly together by welding. The inner side of the tubular framework is an inner wall within the vehicle. The outer side of the tubular framework, facing the outer panel, is a stiffening wall. The stiffening wall is hidden within a closed space between the outer panel and the inner wall.

26 Claims, 9 Drawing Sheets

FRAMING STRUCTURE AROUND VEHICLE DOOR OPENING

BACKGROUND OF THE INVENTION

1. Field of the Invention

The present invention relates to a framing structure around a door opening of a vehicle.

2. Description of the Related Art

Figure 8:
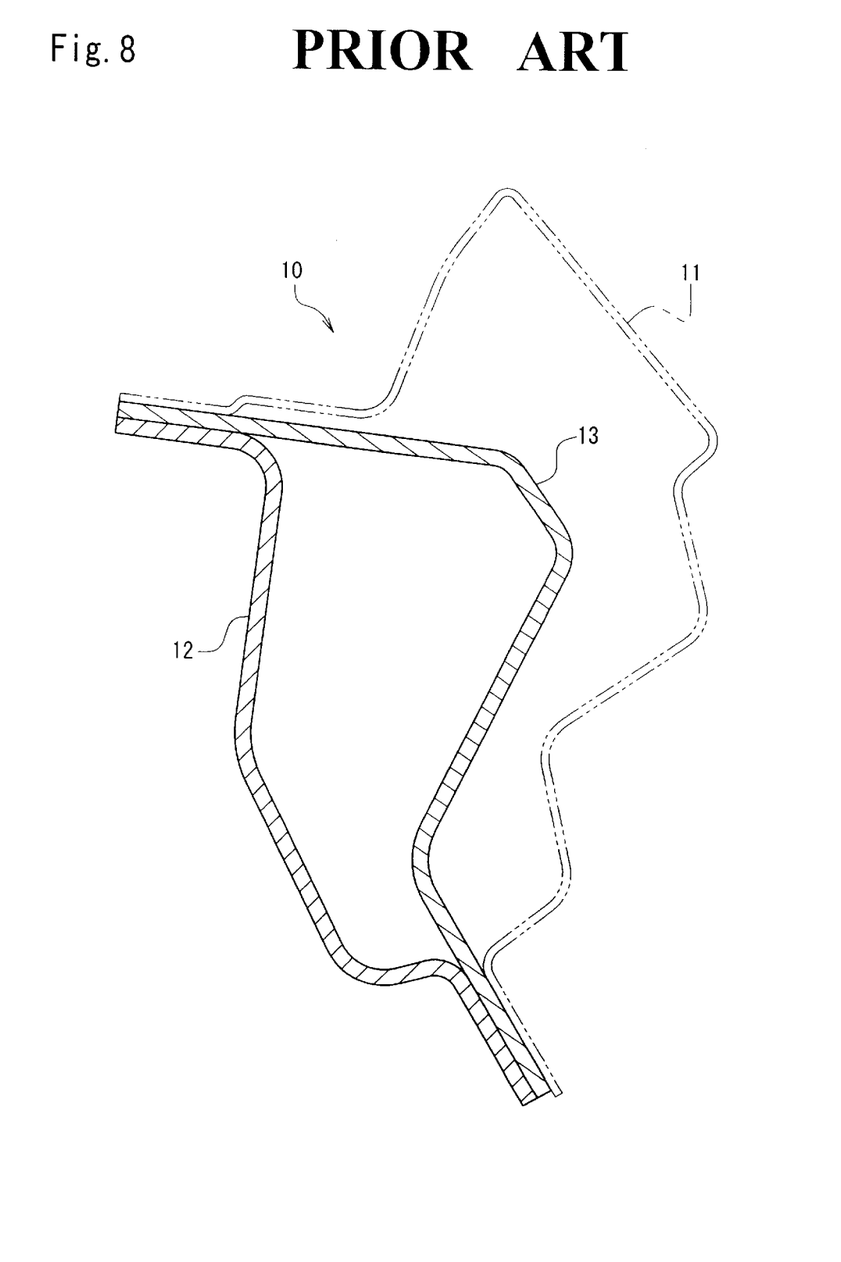
FIG. 8 is a section view of a conventional framing structure.

Referring to FIG. 8, a conventional framing structure 10 around a vehicle door opening includes an outer panel 11 and an inner panel 12. A stiffening panel 13 is a reinforcing member disposed in a space closed between outer panel 11 and inner panel 12. All of outer panel 11, inner panel 12 and stiffening panel 13 are stamped steel. Outer panel 11, inner panel 12 and stiffening panel 13 are joined together by conventional spot welding. Generally, the thickness of outer panel 11 is about 0.8 mm. Outer panel 11 provides the outer appearance of the vehicle. Inner panel 12 and stiffening panel 13 each have a thickness of about 2 mm to perform the function of contributing to the frame strength of the vehicle body.

In the conventional framing structure 10, inner panel 12 and stiffening panel 13 must be formed using four to five press molds. Another disadvantage is that the conventional process generates much scrap during the manufacture of inner panel 12 and stiffening panel 13. Further, inner panel 12 and stiffening panel 13 are joined together by spot welding and their joining portions are spaced a certain distance from each other, so that the disadvantage of such construction is inferior in view of strength and stiffness.

Figure 9:
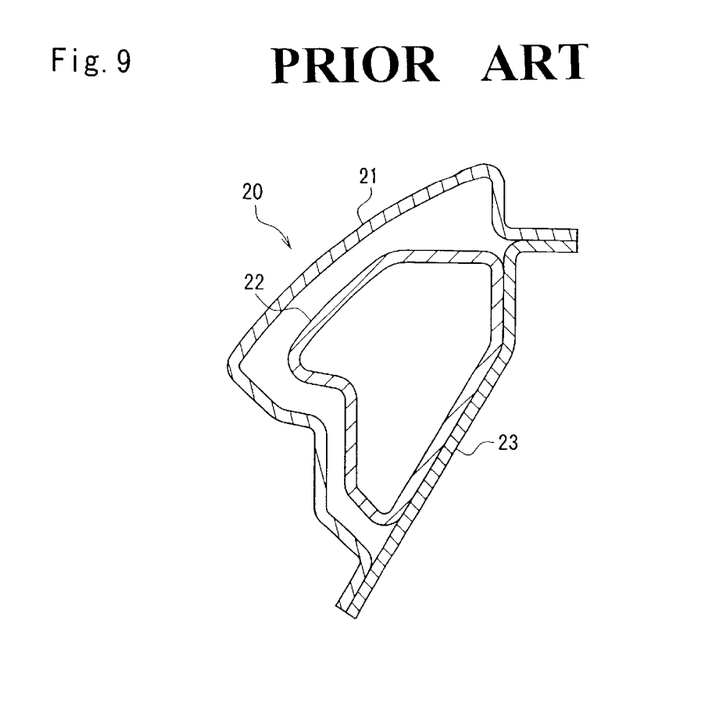
FIG. 9 is a section view of another conventional framing structure.

Referring now to FIG. 9, another conventional framing structure, disclosed in Japanese Laid-open Patent Publication No. 2000-219154, includes a side structure 20 in a vehicle having an outer panel 21 and an inner closed tube 22. Inner closed tube 22 is formed by a tube hydraulic-forming process. Outer panel 21 and inner closed tube 22 are partially joined together by an inner band 23. Such partial joining is inferior in view of strength and stiffness. In addition, inner band 23 entails additional weight and an increase in the number of parts. Furthermore, in addition to joining of inner closed tube 22 and inner band 23, inner band 23 and outer panel 21 must be also joined together. Thus, the joining process must be done at least twice.

A construction similar to side structure 20 is also disclosed in Japanese Laid-open Patent Publications Nos. 2000-219153, 2000-219152 and 2000-219150.

Figure 10:
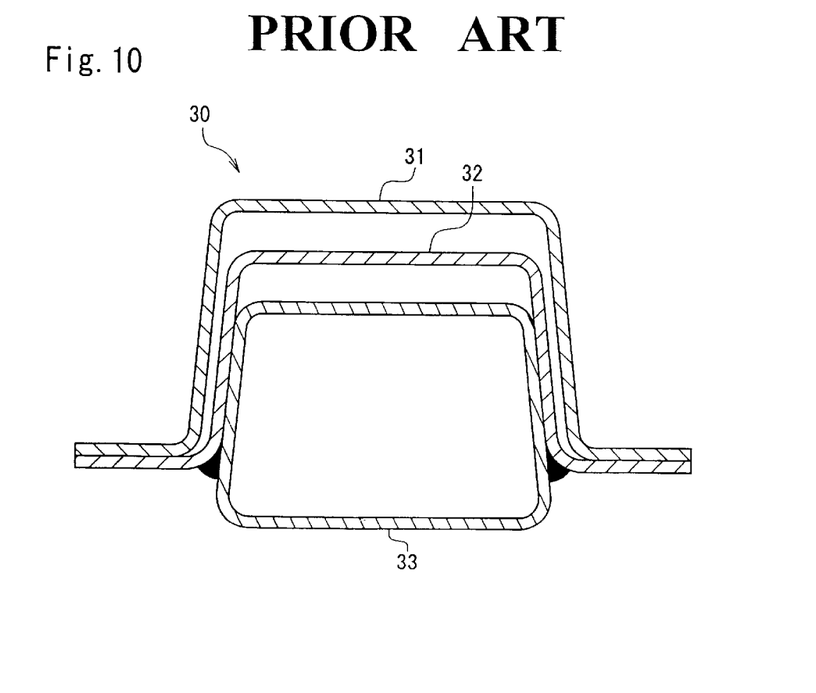
FIG. 10 is a section view of a center pillar of a further conventional framing structure.

Referring now to FIG. 10, a conventional framing structure in a vehicle, disclosed in Japanese Laid-open Patent Publication No. 2000-95146, includes a center pillar 30 consisting of an outer panel 31, an outer reinforced frame 32 and a tubular reinforced frame 33. Outer panel 31 and tubular reinforced frame 33 are joined together by way of outer reinforced frame 32. That is, outer reinforced frame 32 and tubular reinforced frame 33 are welded together. Then outer reinforced frame 32 is welded to outer panel 31. Accordingly, outer reinforced frame 32 as an intermediate means adds weight, constitutes an additional part and adds a welding process. Since outer reinforced frame 32 is disposed extensively along the entire surface of tubular reinforced frame 33, adds more weight than does side structure 20 in FIG. 9.

The above, and other objects, features and advantages of the present invention will become apparent from the following description read in conjunction with the accompanying drawings, in which like reference numerals designate the same elements.

OBJECTS AND SUMMARY OF THE INVENTION

The present invention has been accomplished in order to solve the foregoing disadvantage of the prior art.

It is therefore an object of the present invention to provide a framing structure around a vehicle door opening, which has superior strength and stiffness while enhancing high productivity.

According to an embodiment of the invention, a framing structure around a vehicle door opening, comprises an outer panel disposed around a vehicle door opening and a tubular framework disposed inside the vehicle door opening to form a basic framing. The tubular framework is formed by a tube hydraulic-forming process. The outer panel and the tubular framework are joined together by welding. The tubular framework is, at an inner side of the vehicle, provided with an inner wall, while being, at an opposite side facing the outer panel, provided with a stiffening wall. The stiffening wall is disposed in a closed space between the outer panel and the inner wall.

Under such construction, the tubular framework formed by a tube hydraulic-forming process constitutes the inner wall and the stiffening wall both of which are integrally formed. Since the tubular framework is welded directly to the outer panel, the present framing structure exhibits superior strength, stiffness and productivity. In addition, since the tubular framework is completely covered by the outer panel, changes or modifications of the tubular framework do not harm an external appearance of the vehicle body.

According to a feature of the invention, the tubular framework forms a first tubular framework comprising a roof side rail part and a front pillar upper rail part. The first tubular framework constitutes the inner wall and the stiffening wall, both of which are formed integrally.

According to a further feature of the invention, the tubular framework forms a second tubular framework comprising a front pillar lower rail part and a side sill rail part extending horizontally. The second tubular framework constitutes the inner wall and the stiffening wall, both of which are formed integrally.

According to another feature of the invention, a lower end of the front pillar upper rail part is fixed with an upper end of the front pillar lower rail part. Accordingly, it is no problem at all that a section profile of the other part of the roof side rail and the front pillar upper rail differ from that of other parts of the front pillar lower rail and the side sill rail.

According to a still further feature of the invention, the outer panel and the tubular framework are welded together. Welding is performed by laying one of the parts upon the other, on either the side nearer to vehicle door opening or the opposite side.

According to yet another feature of the invention, the outer panel and the tubular framework are welded together with one element being laid one upon the other, on both of the side nearer to vehicle door opening, and the opposite side.

According to another feature of the invention, on at least one of the side nearer to vehicle door opening and the opposite side, the outer panel and the tubular framework are not laid one upon the other, but an end of the outer panel is joined to the tubular framework for welding. Accordingly, it is not required to provide the outer panel with a flange for welding on at least one of the side nearer to vehicle door opening and the opposite side.

According to another feature of the invention, the outer panel and the tubular framework are not laid one upon the other, but both ends of the outer panel are joined to the tubular framework for welding on both the side nearer to the vehicle door opening, and the opposite side. Accordingly, a flange for welding is not required on the outer panel or on both the side nearer to vehicle door opening, and the opposite side. As a result, the cross-sectional size of the tubular framework may be reduced.

According to other features of the invention, the outer panel and the tubular framework are welded together by laser welding. Accordingly, unlike spot welding, it is, unnecessary to apply pressure to the parts during welding.

According to a final feature of the invention, the tubular framework is made of high tensile strength steel, so that the strength and stiffness of the framing structure around the vehicle door opening are enhanced.

The above, and other objects, features, and advantages of the present invention will become apparent from the following description read in conjunction with the accompanying drawings, in which like reference numerals designate the same elements.

DETAILED DESCRIPTION OF THE PREFERRED EMBODIMENTS

Referring first to FIGS. 1–5, a vehicle door opening 1 is surrounded by an outer panel 2 which is made, for example, of a single sheet of steel. Outer panel 2 preferably is made by stamping. A first tubular framework 3 and a second tubular framework 4 constitute a basic structure around vehicle door opening 1. Each of the first and second tubular frameworks 3, 4 is made, for example, of a high tensile strength steel. A tubular construction of first and second tubular frameworks 3, 4 are preferably formed by tube hydraulic forming. First tubular framework 3 and second tubular framework 4 are disposed inside outer panel 2 and joined together by welding or the like. Further, both of first and second tubular frameworks 3, 4 are welded directly to outer panel 2. They are called as a whole, "a tubular framework complex 5".

First tubular framework 3 and second tubular framework 4 each has an inner wall 102 which is positioned inside the vehicle, that is, at the opposite side from outer panel 2. Each of these elements has a stiffening wall 103 positioned on the side of the outer panel 2. The stiffening wall 103 is formed in a closed space between inner wall 102 and outer panel 2 in order to stiffen the whole of the framing structure. An overall structure 6 around vehicle door opening 1 comprises a first tubular framework 3, a second tubular framework 4 and an outer panel 2. The closed space enclosed by the outer panel 2 and the inner wall 102 indicates the space enclosed by a loop which is formed by outer panel 2 and inner wall 102, irrespective of whether or not it is welded.

Figure 1:
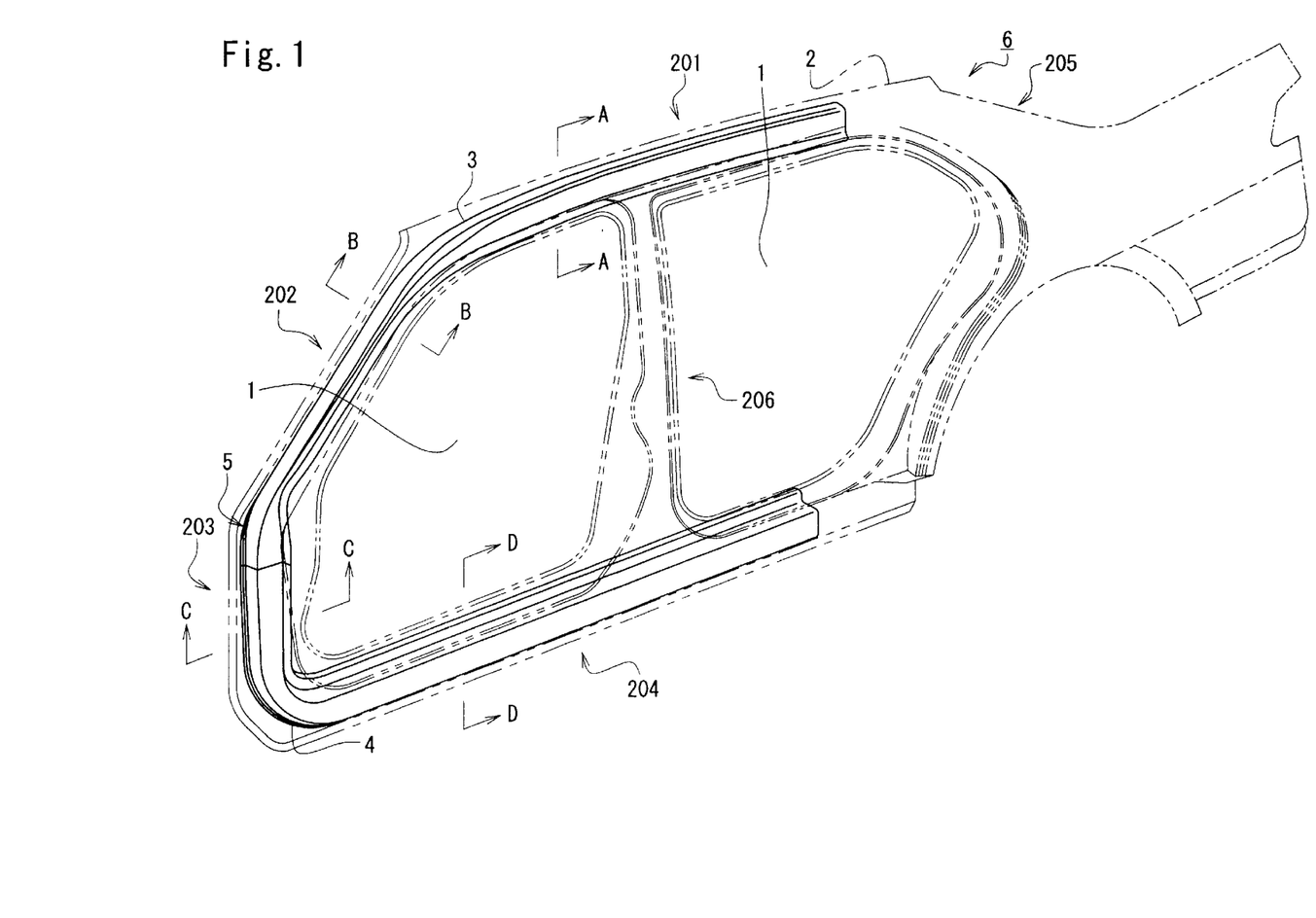
FIG. 1 is a perspective view of an embodiment of a framing structure around a vehicle door opening according to the present invention.
Figure 2:
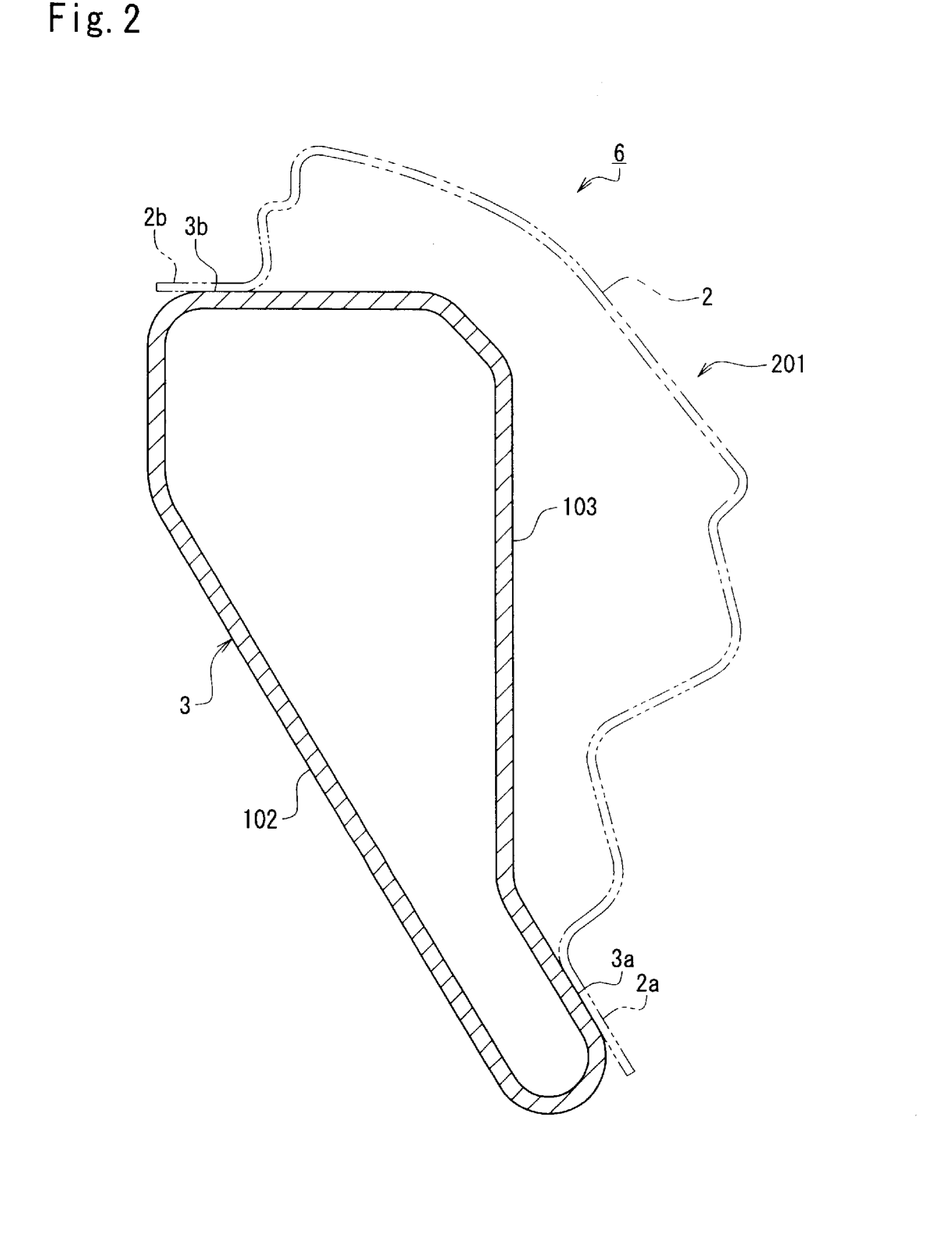
FIG. 2 is a section view taken along line A—A in FIG. 1.
Figure 3:
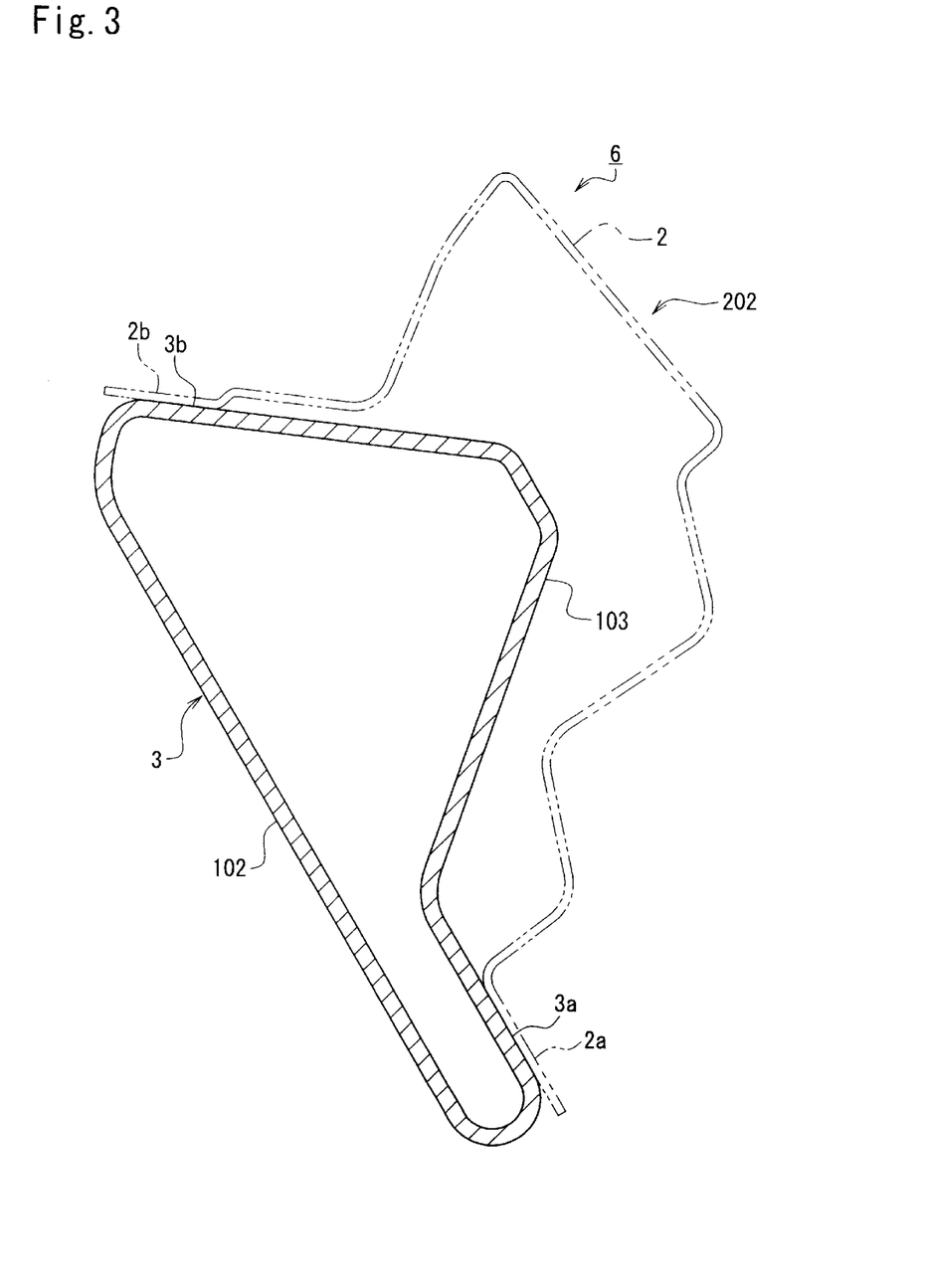
FIG. 3 is a section view taken along line B—B in FIG. 1.
Figure 4:
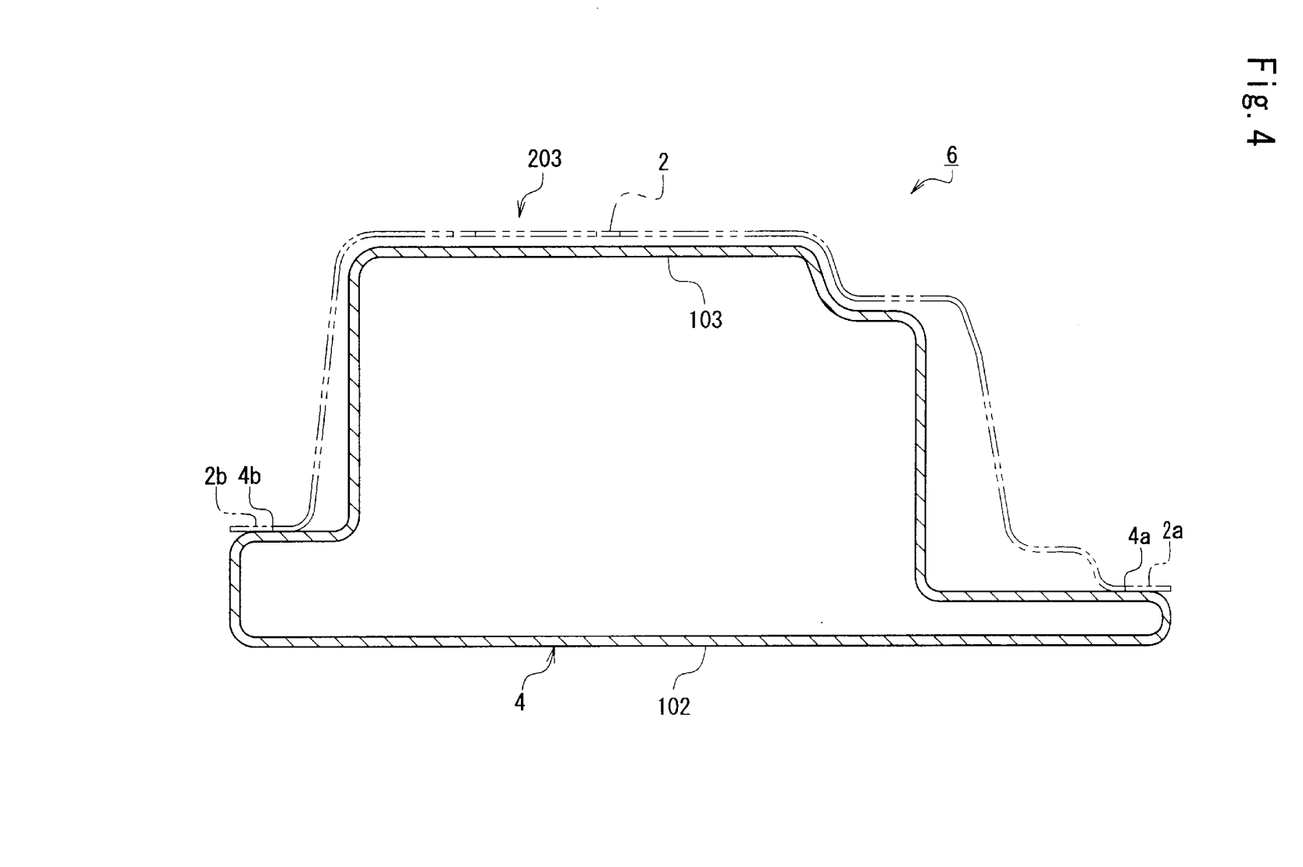
FIG. 4 is a section view taken along line C—C in FIG. 1.
Figure 5:
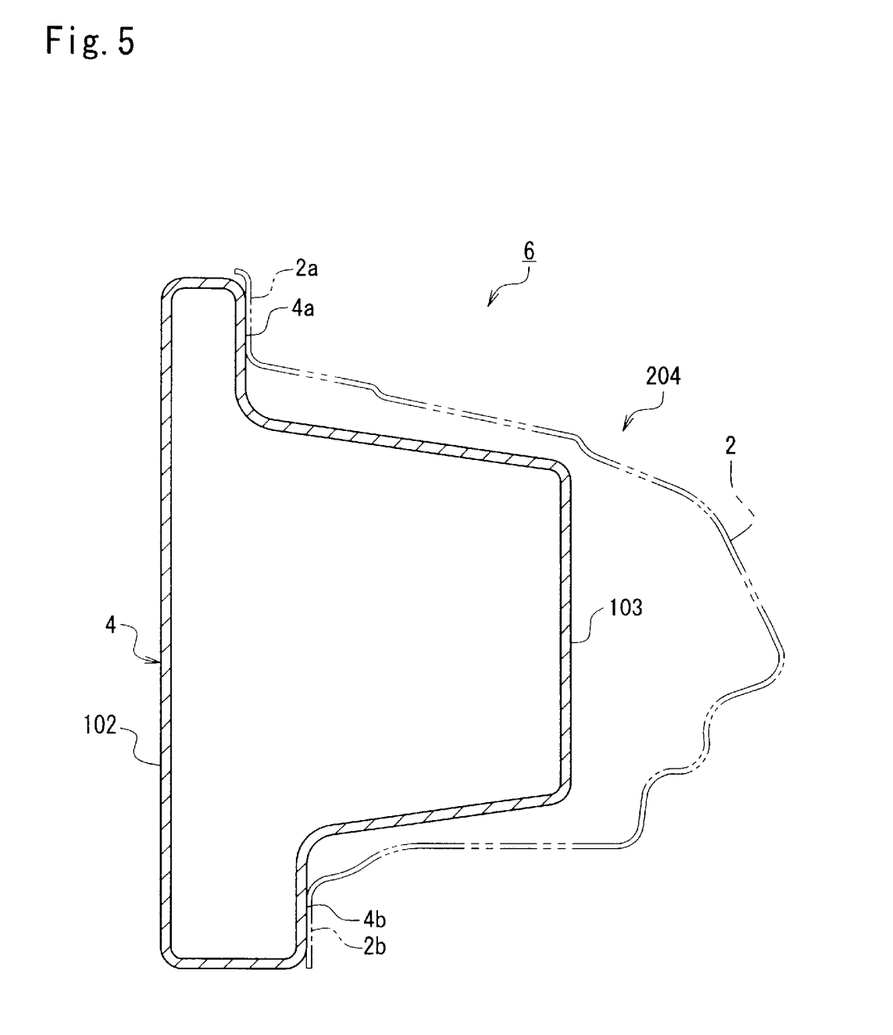
FIG. 5 is a section view taken along line D—D in FIG. 1.

As shown in FIG. 1, first tubular framework 3 forms a tubular rail structure consisting of a roof side rail portion 201 and a front pillar upper rail 202 while forming integrally inner wall 102 and stiffening wall 103. First tubular framework 3 has, on its first side, which is nearer to vehicle door opening 1, a first welding part 3a. On its second side, which is opposite to the first side and the farther side from vehicle door opening 1, first tubular framework 3 has a second welding part 3b.

Second tubular framework 4 also forms a tubular rail structure consisting of a front pillar lower rail 203 and a side sill rail 204 while forming integrally inner wall 102 and stiffening wall 103. Second tubular framework 4 has, on its first side, which is nearer to vehicle door opening 1, a third welding part 4a, while it has, on its second side, which is opposite to the first side and further side from vehicle door opening 1, a fourth welding part 4b.

A lower end of front pillar upper rail 202 is fixed to an upper end of front pillar lower rail 203 by welding or the like. Thus, a framework complex 5 is formed consisting of first tubular framework 3 and second tubular framework 4. As a whole, framework complex 5 forms roof side rail 201, front pillar upper rail 202, front pillar lower rail 203 and side sill rail 204.

By joining outer panel 2 and framework complex 5 directly together by, e.g., laser welding, an overall structure 6 around a vehicle door opening is formed as shown in FIG. 1. More specifically, outer panel 2 and tubular framework complex 5 are welded together while they are laid one upon the other, on both of the first and the second sides. That is, whereas a first flange 2a of outer panel 2 is welded to first welding part 3a of first tubular framework 3 on the first side, which is nearer to vehicle door opening 1, a second flange 2b of outer panel 2 is welded to second welding part 3b of first tubular framework 3 on the second side, which is opposite to the first side and the farther side from vehicle door opening 1. On the other hand, whereas first flange 2a of outer panel 2 is welded to third welding part 4a of second tubular framework 4 on the first side, which is nearer to vehicle door opening 1, second flange 2b of outer panel 2 is welded to fourth welding part 4b of second tubular framework 4 on the second side, which is opposite to the first side and the farther side from vehicle door opening 1.

The advantageous effects of the present invention are discussed hereinafter.

First tubular framework 3 and second tubular framework 4 are formed in tubular shape by tube hydraulic forming. Each of tubular frameworks 3, 4 has inner wall 102 and stiffening wall 103 formed integrally. This endows both of them with superior strength and stiffness. Further, tubular frameworks 3, 4 work, as a whole, as a stiffening part, so parts 3a, 3b, 4a, 4b for welding with outer panel 2 also function as stiffening parts. Accordingly, the said frameworks 3, 4 and structure 6 may easily ensure necessary strength within the limited area around the vehicle door opening 1, even though parts for welding with outer panel 2 are provided on frameworks 3, 4. Since each of tubular frameworks 3, 4 is welded directly to the outer panel 2, the disadvantage of a conventional technique requiring additional parts and additional forming process has been removed. Further, the present framing structure improves productivity while providing a structure having superior strength and stiffness. Thus, no intermediate member, such as the prior-art inner band 23 or outer reinforced frame 32 shown in FIGS. 9 and 10, is required at the time of welding.

Consequently, the weight of the present framing structure is reduced greatly because of the reduction in the number of parts. Further, since first tubular framework 3 and second tubular framework 4 are completely covered by outer panel 2, changes or modifications of them does not harm the external appearance of the vehicle body. As discussed above, because tubular frameworks 3, 4 are different from outer panel 2 and not visible from the outside, finishing process for them may be simplified or omitted. This may also increase the productivity. On the other hand, outer panel 2 is an outside part, but its exterior is not spoiled when it is formed as a whole to be jointless.

As discussed, tubular framework complex 5 consists of first tubular framework 3 comprising roof side rail part 201 and front pillar upper rail 202, and second tubular framework 4 comprising front pillar lower rail 203 and side sill rail 204. Since a lower end of first tubular framework 3 is joined to an upper end of second tubular framework 4, that is, since tubular frameworks 3, 4 are independent components, it is no problem that the cross-sectional size of a main part of the former may differ greatly from that of the latter.

As discussed above, on both of the side nearer to vehicle door opening 1 and the opposite side, outer panel 2 and tubular framework complex 5 are welded together while one is laid directly upon the other. That is, flange 2a (2b) and parts 3a, 4a (3b, 4b) are welded while they are directly laid one upon the other, so this welding is easier compared to welding by joining the end of outer panel 2 to tubular framework complex 5. Moreover, because outer panel 2 and tubular framework complex 5 are welded together by laser welding, different from spot welding, the application of pressure to the welding parts is not required, so that tubular structure of framework complex 5 may not be crushed. This makes concern for crushing of tubular structure unnecessary, so that productivity of this structure 6 is further increased.

The present invention is not limited to any of the foregoing embodiments. Various changes or modifications are available. For example, first tubular framework 3 comprises roof side rail 201 and front pillar upper rail 202, but it may be composed of either one of them. Further, first tubular framework 3 may comprise roof side rail 201, front pillar upper rail 202, front pillar lower rail 203 and side sill rail 204 all integrally formed.

On the other hand, second tubular framework 4 comprises front pillar lower rail 203 and side sill rail 204, but it may be composed of either one of them just like first tubular framework 3. The same way it may comprise roof side rail 201, front pillar upper rail 202, front pillar lower rail 203 and side sill rail 204 all integrally formed. That is, tubular frameworks 3, 4 may be parts constituting a framework of any place around vehicle door opening 1, such as, for example, roof side rail 201, side sill rail 204, front pillar 202, 203, center pillar 206, and rear pillar 205, as long as one side of tubular structure of frameworks 3, 4 which is positioned inside the vehicle constitutes inner wall 102 and the other side of the tubular structure which is positioned on the side of outer panel 2 constitutes stiffening wall 103.

Figure 6:
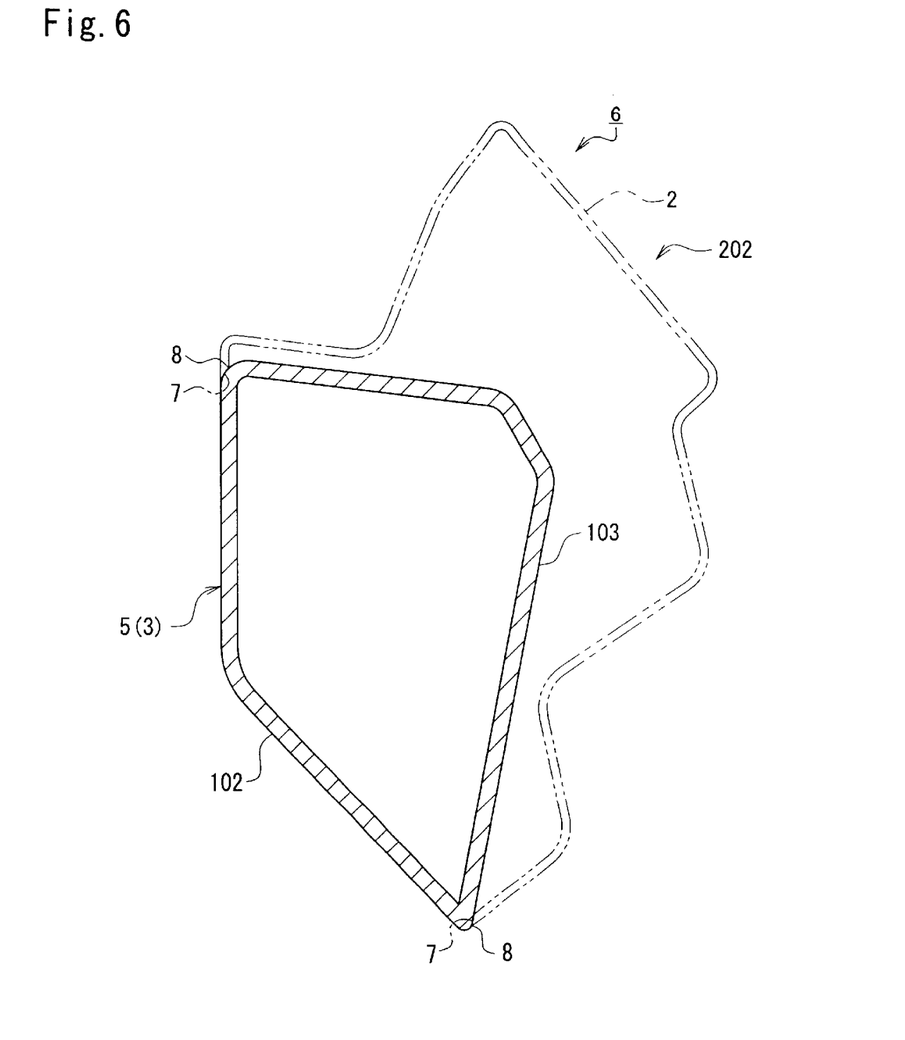
FIG. 6 is a section view of another embodiment of a framing structure around a vehicle door opening, similar to FIG. 3.

As discussed above, outer panel 2 and tubular framework complex 5 are laid one upon the other for welding on the first side, which is nearer to vehicle door opening 1, and on the second side, which is opposite to the first side and the farther side from vehicle door opening 1. However, as shown in FIG. 6, two opposite ends 7, 7 of outer panel 2 may be joined to two opposite corners 8, 8 for welding of each of first and second tubular frameworks 3, 4 by laser welding or the like. Accordingly, it is no longer necessary to provide flanges 2a, 2b as welding parts with outer panel 2. As a result, the cross-sectional size of tubular framework complex 5 may be made smaller, so good use may be made of the extra area in other ways, and may be more compact and lighter. On the contrary, when the cross-sectional size of tubular framework complex 5 is not made smaller, that is, when the effective area of tubular framework complex 5 is extended to fill the area which welding parts occupy, its strength and stiffness is increased.

Figure 7:
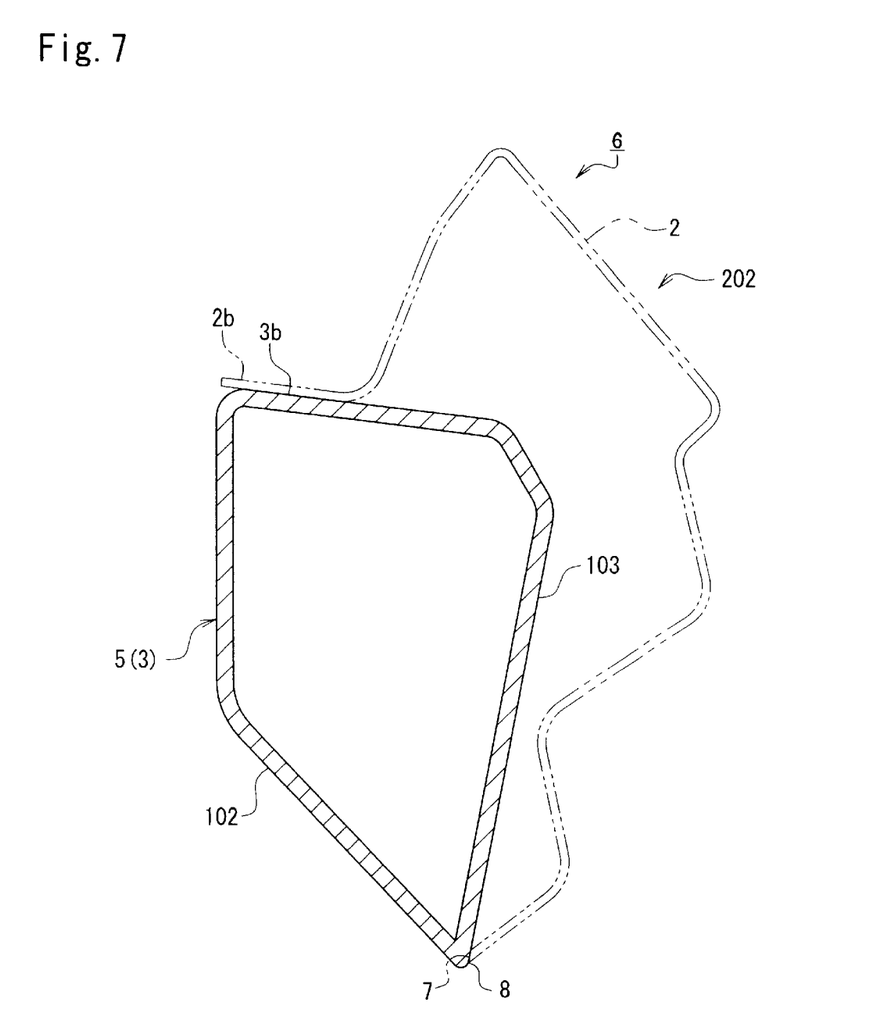
FIG. 7 is a section view of a further embodiment of a framing structure around a vehicle door opening, similar to FIG. 3.

As shown in FIG. 7, outer panel 2 and tubular framework complex 5 may be, on either the side nearer to vehicle door opening 1 or the opposite side, welded together while being directly laid one upon the other. On the other side, an end 7 of outer panel 2 may be joined to, for example, a corner 8 of tubular framework complex 5 by laser welding or the like.

Further, the present framing structure around vehicle door opening 1 may be formed by first tubular framework 3 and outer panel 2, or second framework 4 and outer panel 2, instead of being formed by first and second tubular frameworks 3, 4.

Further, outer panel 2 and tubular framework complex 5 may be welded at one or more spots like being welded intermittently, instead of being welded consecutively along their full length.

As discussed above, both first and second tubular frameworks 3, 4 are made of a high tensile strength steel, but they may be made of a normal steel, aluminum alloy or the like. The foregoing laser welding process may be replaced with an arc welding process or other welding processes.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A framing structure around a vehicle door opening, comprising:

an outer panel disposed around said vehicle door opening;

a tubular framework inside said vehicle door opening to form a basic framing;

said tubular framework being formed by tube hydraulic forming;

said outer panel and said tubular framework being joined directly together by welding, wherein the weld is located on a continuous circumferential portion of the tubular framework;

said tubular framework including, at an inner side of said vehicle, an inner wall, and at an opposite side facing said outer panel, including a stiffening wall; and said stiffening wall being disposed in a closed space between said outer panel and said inner wall.

2. A framing structure around a vehicle door opening, according to claim 1, wherein said tubular framework forms a first tubular framework comprising a roof side rail and a front pillar upper rail.

3. A framing structure around a vehicle door opening, according to claim 1, wherein said tubular framework forms a second tubular framework comprising a front pillar lower rail and a side sill rail.

4. A framing structure around a vehicle door opening, according to claim 1, wherein:

said tubular framework forms a first tubular framework and a second tubular framework; and said first tubular framework is a roof side rail and a front pillar upper rail;

said second tubular framework is a front pillar lower rail and a side sill rail; and a lower end of said front pillar upper rail is fixed to an upper end of said front pillar lower rail.

5. A framing structure around a vehicle door opening, according to claim 1, wherein said outer panel and said tubular framework are welded together while being laid one upon the other, on at least one of the side nearer to vehicle door opening and the opposite side.

6. A framing structure around a vehicle door opening, according to claim 1, wherein said outer panel and said tubular framework are welded together while being laid one upon the other, on both the side nearer to vehicle door opening, and the opposite side.

7. A framing structure around a vehicle door opening, according to claim 1, wherein, on at least one of the side nearer to vehicle door opening and the opposite side, said outer panel and said tubular framework are not laid one upon the other, but an end of said outer panel is joined to said tubular framework for welding.

8. A framing structure around a vehicle door opening, according to claim 1, wherein said outer panel and said tubular framework are not laid one upon the other, but both ends of said outer panel are joined to said tubular framework for welding on both the side nearer to vehicle door opening, and the opposite side.

9. A framing structure around a vehicle door opening, according to claim 2, wherein said outer panel and said first tubular framework are welded together while being laid one upon the other, on both the side nearer to vehicle door opening, and the opposite side.

10. A framing structure around a vehicle door opening, according to claim 2, wherein said outer panel and said first tubular framework are not laid one upon the other, but both ends of said outer panel are joined to said first tubular framework for welding on both the side nearer to vehicle door opening, and the opposite side.

11. A framing structure around a vehicle door opening, according to claim 3, wherein said outer panel and said second tubular framework are welded together while being laid one upon the other, on both the side nearer to vehicle door opening, and the opposite side.

12. A framing structure around a vehicle door opening, according to claim 3, wherein said outer panel and said second tubular framework are not laid one upon the other, but both ends of said outer panel are joined to said second tubular framework for welding on both the side nearer to vehicle door opening, and the opposite side.

13. A framing structure around a vehicle door opening, according to claim 1, wherein said outer panel and said tubular framework are laser welded.

14. A framing structure around a vehicle door opening, according to claim 1, wherein said tubular framework is made of a high tensile strength steel.

15. A framing structure around a vehicle door opening comprising:

a tubular member;

an outer panel of said vehicle;

said outer panel being welded to said tubular member, wherein the weld is located on a continuous circumferential portion of the tubular framework;

an inner surface of said tubular member facing an inside of said vehicle;

an outer surface of said tubular member being contained within, and spaced from said outer panel, thereby forming a stiffening wall.

16. A framing structure around a vehicle door opening according to claim 15, wherein said stiffening wall is hidden between said outer panel and said inner surface.

17. A framing structure around a vehicle door opening, according to claim 2, wherein said outer panel and said first tubular framework are welded together while being laid one upon the other, on at least one of the side nearer to vehicle door opening and the opposite side.

18. A framing structure around a vehicle door opening, according to claim 2, wherein on at least one of the side nearer to vehicle door opening and the opposite side, said outer panel and said first tubular framework are not laid one upon the other, but an end of said outer panel is joined to said first tubular framework for welding.

19. A framing structure around a vehicle door opening, according to claim 3, wherein said outer panel and said second tubular framework are welded together while being laid one upon the other, on at least one of the side nearer to vehicle door opening and the opposite side.

20. A framing structure around a vehicle door opening, according to claim 3, wherein on at least one of the side nearer to vehicle door opening and the opposite side, said outer panel and said second tubular framework are not laid one upon the other, but an end of said outer panel is joined to said second tubular framework for welding.

21. A framing structure around a vehicle door opening, according to claim 1, wherein said tubular framework comprises a roof side rail.

22. A framing structure around a vehicle door opening, according to claim 1, wherein said tubular framework comprises a front pillar upper rail.

23. A framing structure around a vehicle door opening, according to claim 1, wherein said tubular framework comprises a front pillar lower rail.

24. A framing structure around a vehicle door opening, according to claim 1, wherein said tubular framework comprises a side sill rail.

25. A framing structure around a vehicle door opening, according to claim 1, wherein said tubular framework comprises a center pillar.

26. A framing structure around a vehicle door opening, according to claim 1, wherein said tubular framework comprises a rear pillar.

* * * * *